Figure 1:
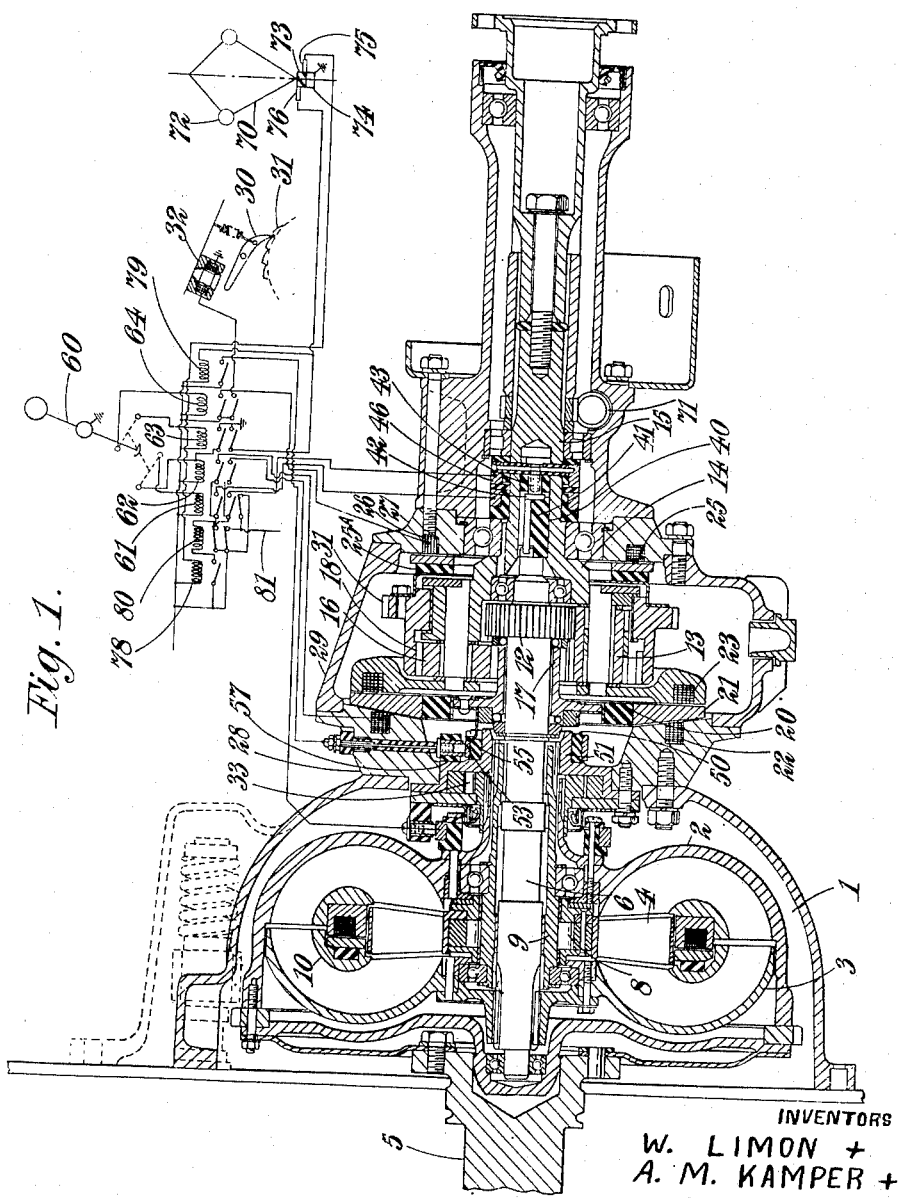

March 23, 1954  W. LIMON ET AL  2,672,763
CHANGE-SPEED GEARING

Filed May 7, 1951  2 Sheets-Sheet 2

INVENTORS
W. LIMON +
A. M. KAMPER +
G. BERRY
By
Wilkinson + Mawhinney
ATTY'S.

Patented Mar. 23, 1954

2,672,763

UNITED STATES PATENT OFFICE 2,672,763

CHANGE-SPEED GEARING

Walter Limon, Andrew Mathis Kamper, and Geoffrey Berry, Coventry, England, assignors to Humber Limited, Stoke, Coventry, England Application May 7, 1951, Serial No. 225,006

Claims priority, application Great Britain May 8, 1950

12 Claims. (Cl. 74—472)

The invention relates to power transmission systems of motor vehicles by which the power is transmitted from the motor to the road wheels and has for an object the provision of a transmission which effects a satisfactory compromise between the conflicting advantages and disadvantages of a non-automatic system incorporating manually operable multi-ratio gears for conversion of torque and a completely automatic system embodying a kinetic hydraulic torque converter. The principal advantage of the first-mentioned system is that the degree of torque conversion is under the control of the driver to suit varying circumstances. The principal disadvantage is that even with modern aids to synchronisation of the gear ratios some degree of skill and experience are required to obtain smooth changes of ratio. The principal advantages of the second mentioned system are that it is automatic and continuous in torque conversion and the principal disadvantages are that the range of torque conversion is, in practice, limited below that required and the mechanical efficiency is low.

Various proposals to combine a hydraulic torque converter with a clutch and brake operated epicyclic change speed gear have been made and the present invention achieves the above object by the incorporation with such a combination of means for reducing shock on engagement of the clutches or brakes.

The hydraulic torque converters employed in carrying out the invention are of the kind embodying an annular vaned driving member or impeller, an annular vaned driven member or turbine and a vaned reaction member which is held against rotation in at least one direction. Torque converters of this kind have been extensively developed by P. M. Salerni and are sometimes known as Salerni torque converters.

The invention provides in the drive from the motor to the road wheels of a motor vehicle, the combination of a kinetic hydraulic torque converter, an epicyclic gear change mechanism providing two or more fixed forward speed ratios, an electro-magnetic or electro-magnetically operated friction clutch or brake operable to bring into operation one of the speed ratios and electric switch means arranged to maintain the clutch or brake disengaged until at least approximate synchronisation of the clutch or brake members has been attained, the switch means comprising two parts of which one is constantly urged through a friction drive capable of slip to rotate in synchronism with one of the members of the clutch or brake or to remain stationary with the fixed member of the brake and the other part is rotated (e. g. positively) with the other clutch or brake member, the two parts having a lost-motion connection and having electric contacts so arranged that when the lost-motion is taken up in one direction the switch is set to de-energise the clutch or brake and when the lost-motion is taken up in the other direction the switch is set to energise the clutch or brake, the arrangement being that the switch changes from the first setting to the second when the relative movement between the clutch or brake parts resulting from the previous engagement of a gear other than that to which they are appropriated, changes direction.

There may be two or more clutches or brakes appropriated to different gear ratios and each clutch or brake may have switch means as aforesaid.

The appropriate switch means may be arranged also to cut out the motor ignition during the period of gear change from a low to a higher gear ratio.

Preferably a speed control switch is included and arranged to render the switch means ineffective until a predetermined driven member or road speed has been reached.

Preferably an electro-magnetically operated friction clutch or brake is employed to effect engagement of one of the gears and has the features that the clutch or brake armature is an annulus providing one of the friction members and that the armature is secured to a driving or driven member by an annulus of rubber or like resilient material which resilient annulus permits by its resilience axial movement of the armature to engage and disengage the clutch or brake and also transmits the drive to or from the armature.

It is also preferred that the armature is common to two electro-magnets one on each side of the armature in the axial direction and appropriated to two gear ratios respectively and that the flexible annulus permits axial movement of the armature into alternative clutching or braking engagement with the two magnets.

One of the friction faces of the above-mentioned clutches or brakes or of an additional clutch or brake (e. g. for a reverse drive) may be supported from a driving or driven member behind the friction face by an annulus of individual pads of rubber or like resilient material affording a resilient shock-absorbing connection which also permits a small amount of circumferential movement of the friction face.

Figure 2:
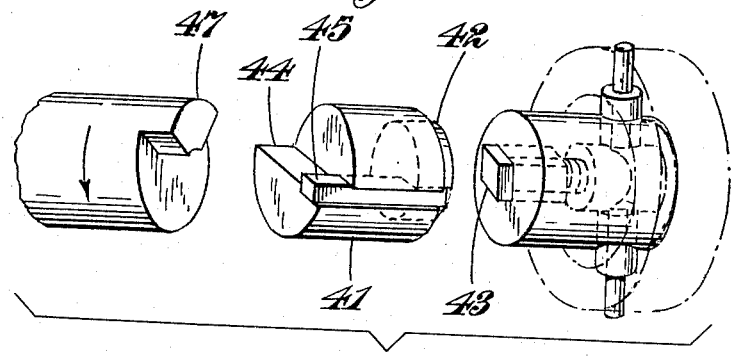
Figure 3:
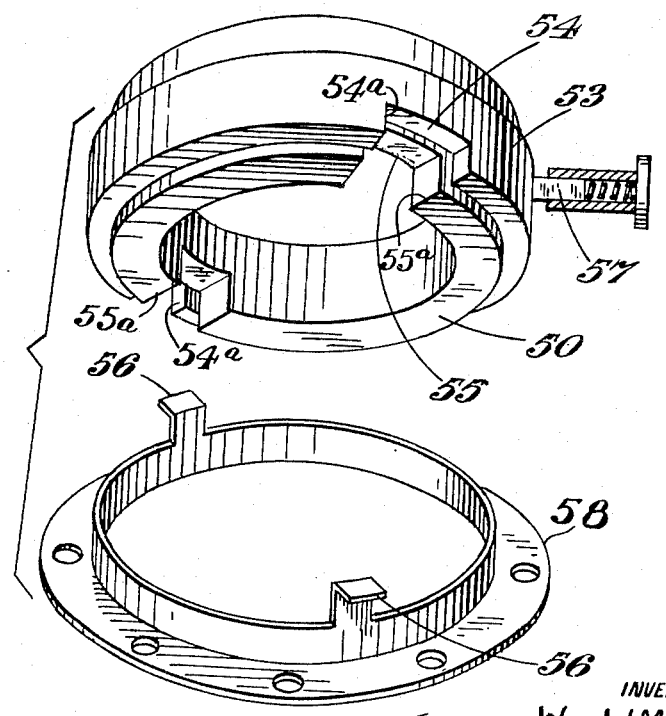

A specific example of the invention as applied to two-speed gear box in driven association with a hydraulic torque converter will now be described with reference to the accompanying drawings in which:

Figure 1 represents a section through the converter and gear box and incorporates a wiring diagram, Figure 2 is an exploded view of the direct drive synchronising switch and Figure 3 is an exploded view of the low gear synchronising switch.

In the mechanism shown in the drawings the torque converter is shown at 1 and comprises a driving member 2, a driven member 3 and a reaction member 4. The driving member is connected to a driving shaft 5. The driven member is splined to an intermediate shaft 6. The reaction member is held against reverse rotation by a free-wheel device 8 and a fixed sleeve 9. Within the torque converter there is a magnetic clutch indicated generally at 10 for clutching the driving and driven members of the converter together.

The intermediate shaft 6 has secured to its rear end a sun wheel 12. This sun wheel meshes with a set of planet wheels 13 on a carrier 14 which is secured to the driven shaft 15. On the same carrier there is a set of secondary planet wheels 16 meshing with the primary planet wheels 13. The secondary planet wheels also mesh with a reaction sun wheel 17 and with a reaction annulus 18.

Secured to the reaction sun wheel 17 through a resilient rubber ring 20 there is an armature 21 which is common to two electro-magnets 22, 23. The magnet 22 is secured to the housing of the gear and is held against rotation. The magnet 23 is carried on the planet carrier 14 and rotates therewith. An armature 25 is secured through a rubber ring 25A to the annulus 18 and co-operates with a magnet coil 26 secured in the housing part 27. The part 27 is magnetically isolated from the remainder of the housing 28 by a ring 29 of non-magnetic material, this ring being enlarged at the bottom to provide an oil sump.

A gear type oil pump 33 is provided for maintaining the converter filled with oil.

A pawl shown diagrammatically at 30 engages teeth 31 on the outside of the annulus 18 and provides a one-way brake for preventing reverse rotation of the annulus. The brake may be engaged and released by a solenoid 32. The brake reinforces the brake 25, 26 to absorb the heavy reaction loads arising from the reverse drive. The brake 25, 26 is arranged to engage shortly before the one-way brake becomes effective and thereby to absorb inertia shocks.

Energisation of the coil 22 holds the sun wheel 17, and the drive from the intermediate shaft is through the sun wheel 12 and the planet wheels to the carrier 14, the sun wheel 17 serving as the reaction gear with the result that a low gear ratio is provided. To engage high gear ratio the coil 22 is de-energised and the coil 23 energised thereby to hold the armature 21 for rotation with the planet carrier so that the planet carrier and the sun wheel 17 are locked together and a direct drive is provided. Energisation of the coil 26 and solenoid 31 holds the annulus against rotation and the reverse ratio is provided. Engagement of the clutch 10 affords a solid drive through the converter.

Synchronising switch means for the direct-drive clutch 23 is located in the socket 40 in the driven shaft 15 containing the tail of the intermediate shaft 6. Within the socket there is a generally cylindrical plug 41 of insulating material which has a close frictional-driving fit within the socket. The plug has at one end—the end remote from the intermediate shaft—an electric contact 42 which makes connection with an insulated resilient contact 43 secured in the base of the socket. At the other end the plug is formed with a diametrical step 44 and at one end of the step there is a contact face 45 electrically connected through the plug to the contact 42 at the other end thereof. This contact face is positioned at the end of the step which faces rearwardly in the direction of normal rotation. The contact 43 in the base of the socket is connected to a slip ring 46 constituting the supply connection to the switch means.

The end of the intermediate shaft 6 is formed with a projection 47 in the shape of a sector of the shaft. This projection fits over the step 44 on the plug and when the intermediate shaft is rotating faster than the driven shaft the projection makes contact with the contact face 45 on the plug, earths the plug and drives the plug against the frictional resistance to rotate at the speed of the intermediate shaft. When the intermediate shaft is rotating at a slower speed than the driven shaft the boss engages the other end of the stop without making electrical contact.

The switch means for the low speed brake 22 comprises a ring 50 of insulating material surrounding a boss 51 on the fixed internal housing of the gear box. The ring has slipping frictional engagement with the boss. The ring has secured to it an external metal slip ring 53 having two notches 54 slightly out of register in the circumferential direction with notches 55 in the ring 50. Received within the pairs of notches 53, 55 are two tongues 56 on a metal ring 58 rotatable with the planet carrier, each tongue fitting within both notches of the pair to which it is allocated. Electrical connection is made to the slip ring through a brush 57. When the tongues engage one circumferential end of the notches they contact the faces 54a of the slip ring and the ring is earthed and when the tongues engage with the other end of the notches they contact the faces 55a of the insulating ring and the electrical connection is broken. The faces 54a at which the connection is made lead the faces 55a at which the connection is broken considered in the direction of normal rotation.

The energisation of the several clutch or brake coils is selected by a small control lever 60 operating in a gate. This lever has four "gear" positions and an intermediate neutral position. The lever when moved to its four positions completes the circuits through four relay coils respectively. These relays 61—64 control engagement of the four clutches or brakes. The relay 61 when energised connects the battery to the magnet coil 23 thereby to energise the magnet and engage the direct drive. The relay 62 energises the magnet 22 and engages the low gear. The relay 63 is intended for emergency use and energises the low gear magnet 22 and also earths the automatic control device indicated at 70 and later described. Relay 64 effects the energisation of the reverse ratio magnet 26 and the solenoid 32. The automatic control device 70 operates centrifugally and is driven by a gear 71 driven from the shaft 15. The weights 72 are attached to an insulating sleeve 73 carrying a contact ring 74. The arrangement is that centrifugal force on the weights 72 causes axial movement of the sleeve 73 to bring the contact ring 74 successively into electrical connection with brushes 75 and 76. The contact 75 controls a relay 78 and the contact 76 controls a relay 79 and energises the relay to engage the clutch 10 when a predetermined vehicle speed has been reached.

The electrical supply to the synchronising switch means 42, 45 for the direct drive clutch 23 is taken through a relay 80 which, when energised, disconnects the supply from the direct drive clutch and also disconnects the supply to the lead 81 to the engine ignition system. There is also in the supply line to the switch means contacts which are operated by the direct-drive clutch-engaging relay 61. These contacts are only closed when the relay 61 is energised to engage the clutch.

When it is desired to change from low gear to direct-drive the lever 60 is moved to energise the relay 61 which completes the circuit to the highgear clutch synchronising switch means 42, 45 assuming the shaft 15 is rotating fast enough for the control device 70 to complete the circuit through relay 78. As the intermediate shaft 6 will be rotating faster than the driven shaft 15 the switch means 42, 45 will be set to earth the circuit and the relay 80 controlled thereby will be energised, thereby to disconnect the supply to the clutch 23 and the supply to the engine ignition lead 81. The engine and intermediate shaft will slow down until the intermediate shaft reaches and just falls below the speed of the driven shaft when the plug 41 will rotate ahead of the boss 47 on the intermediate shaft and will break contact therewith thereby de-energising the relay 80, restoring the supply to the engine ignition and completing the engaging circuit of clutch 23.

To engage the low gear the lever 60 is moved to energise the relay 62. This completes the circuit through the low gear brake synchronising switch means 53, 58 and also closes the relay contacts in the circuit of the brake 22. This circuit however remains open by reason that the relay 80 controlled by the synchronising device 53, 58 is energised. As the speed of the engine increases the brake armature 21 speed decreases and eventually the armature tends to reverse its direction of rotation. On such reversal the connection through the synchronising switch 53, 58 is broken thereby deenergising the relay 80 and allowing the brake circuit to be completed and the brake 22 engaged.

It is to be appreciated that the synchronising devices 42, 43 and 53, 58 are rendered ineffective at low speeds by the speed responsive device 70 and that consequently the clutch 23 and brake 22 can be freely engaged at low speed and without control by the synchronising means 42, 43 and 53, 58.

We claim:

1. In the drive from the motor to the road wheels of a motor vehicle, the combination of a kinetic hydraulic torque converter, an epicyclic gear change mechanism providing at least two fixed forward speed ratios, friction means for bringing into operation one of the speed ratios and comprising two relatively rotatable co-operating friction members of which one is connected to a rotatable member of the gear change mechanism for rotation therewith, electromagnetic means including a coil for bringing the friction members into torque transmitting friction engagement and thereby to bring into operation the aforesaid speed ratio, and electric switch means arranged to maintain the friction members disengaged until at least approximate synchronization of the friction members has been attained, the switch means controlling energization of the coil and comprising two parts of which one has a frictional engagement capable of slip with one of the friction members and the other part is held against rotation relative to the other friction member, the two parts having a lost motion connection and having electric contacts so arranged that when the lost motion is taken up in one direction the switch is set to de-energize the coil and when the lost motion is taken up in the other direction the switch is set to energize the coil, the arrangement being that the switch changes from the first setting to the second when the relative movement between the friction members resulting from the previous engagement of a gear other than that to which they are appropriated, changes direction.

2. The combination as claimed in claim 1 and including at least two pairs of friction members, and electromagnetic means therefor appropriated to different gear ratios and switch means as aforesaid appropriated to each such pair of members and electromagnetic means.

3. The combination as claimed in claim 1 in which the motor has an electrical ignition system and in which the switch means are arranged also to cut out the motor ignition during the period of gear change from a low to a higher gear ratio.

4. The combination as claimed in claim 1 and including a speed controlled switch having a rotatable speed-responsive operating member arranged to render the switch means ineffective until a predetermined driven member speed has been reached, and means for rotating the operating member in synchronism with one of the friction members.

5. In the drive from the motor to the road wheels of a motor vehicle, the combination of a kinetic hydraulic torque converter, an epicyclic gear change mechanism providing at least two fixed forward speed ratios, an electro-magnetically operated friction clutch comprising driving and driven clutch members and operable to bring into operation one of the speed ratios, and electric switch means arranged to maintain the clutch disengaged until at least approximate synchronization of the clutch members has been attained, the switch means comprising two parts of which one is constantly urged through a friction drive capable of slip to rotate in synchronism with one of the members of the clutch and the other part is rotated with the other clutch member, the two parts having a lost motion connection and having electric contacts so arranged that when the lost motion is taken up in one direction the switch is set to de-energize the clutch and when the lost motion is taken up in the other direction the switch is set to energize the clutch, the arrangement being that the switch changes from the first setting to the second when the relative movement between the clutch parts resulting from the previous engagement of a gear other than that to which they are appropriated, changes direction.

6. The combination as claimed in claim 5 in which the friction clutch has an electromagnet and an armature, in which the armature is an annulus providing one of the friction members and in which there is an annulus of resilient material securing the armature to a rotatable driving or driven member, which resilient annulus permits by its resilience relative axial movement between the armature and member to engage and disengage the clutch and also transmits the drive between the member and the armature.

7. The combination as claimed in claim 6 in which the resilient annulus is radially within the armature.

8. The combination as claimed in claim 6 in which there are two electromagnets, one on each side of the armature in the axial direction and appropriated to two gear ratios respectively and in which the flexible annulus permits axial movement of the armature into alternative clutching engagement with the two magnets.

9. The combination as claimed in claim 6 in which one of the clutch faces is supported from a rotatable member behind the clutch face by resilient material which affords a resilient shock-absorbing connection and also affords a driving connection permitting a small amount of circumferential movement between the clutch face and the driving or driven member.

10. The combination as claimed in claim 6 including an additional clutch and in which one of the clutch faces of the additional clutch is supported from a rotatable member behind the clutch face by resilient material which affords a resilient shock-absorbing connection and also affords a driving connection permitting a small amount of circumferential movement between the clutch face and the rotatable supporting member.

11. In the drive from the motor to the road wheels of a motor vehicle, the combination of a kinetic hydraulic torque converter, an epicyclic gear change mechanism providing at least two forward speed ratios, an electromagnetically operated friction brake which comprises an operating coil and rotatable and fixed brake members and which is operable to bring into operation one of the speed ratios, and electric switch means arranged to maintain the brake disengaged until rotation of the rotatable member has at least nearly ceased, the switch means comprising two parts of which one has a frictional engagement capable of slip with one of the brake members and the other part is held against rotation relative to the other brake member, the two parts having a lost motion connection and having electric contacts so arranged that when the lost motion is taken up in one direction the switch is set to de-energize the brake and when the lost motion is taken up in the other direction the switch is set to energize the brake, the arrangement being that the switch changes from the first setting to the second when the rotation of the rotatable brake member resulting from the previous engagement of a gear other than that to which the brake is appropriated, changes direction.

12. The combination as claimed in claim 11 in which there is included in association with a friction brake a mechanical lock arranged positively to hold the brake members fixed against relative rotation after engagement of the brake, and electromagnetic means for releasing the lock.

WALTER LIMON.
ANDREW MATHIS KAMPER.
GEOFFREY BERRY.

References Cited in the file of this patent

UNITED STATES PATENTS

| Number | Name | Date |
|---|---|---|
| 2,078,130 | Edwards | Apr. 20, 1937 |
| 2,168,862 | De Lavaud | Aug. 8, 1939 |
| 2,214,335 | Kurti | Sept. 10, 1940 |
| 2,235,370 | Jandasek | Mar. 18, 1941 |
| 2,372,817 | Dodge | Apr. 3, 1945 |

FOREIGN PATENTS

| Number | Country | Date |
|---|---|---|
| 119,651 | Great Britain | July 29, 1919 |
| 602,803 | Great Britain | June 3, 1948 |
| 618,588 | Great Britain | Feb. 24, 1949 |